US010660275B2

(12) United States Patent
Kadosh

(10) Patent No.: US 10,660,275 B2
(45) Date of Patent: May 26, 2020

(54) ROTATABLE AND FOCUSABLE ILLUMINATION SYSTEM

(71) Applicant: Yossi Kadosh, Petah-Tikva (IL)

(72) Inventor: Yossi Kadosh, Petah-Tikva (IL)

( * ) Notice: Subject to any disclaimer, the term of this patent is extended or adjusted under 35 U.S.C. 154(b) by 0 days.

(21) Appl. No.: 16/424,559

(22) Filed: May 29, 2019

(65) Prior Publication Data

US 2020/0084977 A1  Mar. 19, 2020

Related U.S. Application Data

(60) Provisional application No. 62/730,549, filed on Sep. 13, 2018.

(51) Int. Cl.
| | | |
|---|---|---|
| *A01G 7/04* | (2006.01) | |
| *F21V 7/00* | (2006.01) | |
| *F21V 14/04* | (2006.01) | |
| *F21V 7/04* | (2006.01) | |

(52) U.S. Cl.
CPC ............ *A01G 7/045* (2013.01); *F21V 7/0008* (2013.01); *F21V 7/04* (2013.01); *F21V 14/04* (2013.01)

(58) Field of Classification Search
CPC ........ A01G 7/045; A01G 9/249; F21V 21/15; F21V 14/04; F21V 14/06; F21V 9/02; F21V 13/04; F21V 13/06; F21V 21/22; F21V 21/26; F21V 21/28; F21V 21/29; F21W 2131/109
See application file for complete search history.

(56) References Cited

U.S. PATENT DOCUMENTS

| | | | | |
|---|---|---|---|---|
| 1,035,624 | A * | 8/1912 | McGhee | F21V 17/107 362/322 |
| 1,335,727 | A * | 4/1920 | Eisele | F21S 41/657 362/277 |
| 3,882,306 | A * | 5/1975 | Armstrong | A01G 9/26 362/427 |
| 4,855,884 | A * | 8/1989 | Richardson | F21V 14/04 362/278 |
| 5,590,955 | A * | 1/1997 | Bornhorst | F21S 10/06 362/324 |
| 5,816,691 | A * | 10/1998 | Gordin | F21V 3/04 362/283 |
| 6,866,402 | B2 * | 3/2005 | Belliveau | F21V 21/15 362/272 |
| 7,874,692 | B2 * | 1/2011 | Zheng | F21K 9/00 135/16 |
| 8,449,141 | B1 * | 5/2013 | Hinrichs | F21V 21/15 362/235 |
| 8,604,700 | B2 * | 12/2013 | Waumans | A01G 7/045 315/149 |
| 9,217,559 | B2 * | 12/2015 | Rasmussen | F21V 21/15 |
| 2009/0199470 | A1 * | 8/2009 | Capen | A01G 7/045 47/58.1 LS |
| 2018/0132435 | A1 * | 5/2018 | Yano | G06T 7/0002 |

* cited by examiner

*Primary Examiner* — Ismael Negron
(74) *Attorney, Agent, or Firm* — Alphapatent Associates, Ltd; Daniel J. Swirsky

(57) ABSTRACT

An illumination system including a curved light directing element, a motor for rotating the light directing element, motorized optical focusing means for adjusting the curved light directing element, and a controller for controlling the motor and the motorized optical focusing means and providing equal illumination energy to each area unit of at least one plant.

4 Claims, 4 Drawing Sheets

STEP 1

FIG 1 - STEP 1

FIG 2 - STEP 2

| | Center | Diameter | Period | Schedule |
|---|---|---|---|---|
| 18A | 48°/27° | 8 | 64 | 10:00-10:01 |
| 18B | 22°/24° | 24 | 576 | 10:01-10:10 |
| 18C | 54°/13° | 16 | 256 | 10:10-10:14 |
| 18D | 56°/38° | 16 | 256 | 10:14-10:18 |
| 18E | 70°/27° | 24 | 576 | 10:18-10:27 |

ROTATABLE AND FOCUSABLE ILLUMINATION SYSTEM

CROSS-REFERENCE TO RELATED APPLICATIONS

This application claims the benefit of priority from U.S. Provisional 62/730,549 filed Sep. 13, 2018, the disclosure of which is incorporated herein by reference.

TECHNICAL FIELD

The invention relates to the field of plant growing systems. More particularly, the invention relates to a method and apparatus for illuminating the plant.

BACKGROUND

There is a long felt need to provide minimal photosynthesis illumination energy for growing a plant.

SUMMARY

A photosynthesis illumination system, including:
a lens, controllable for selecting different locations of plants; and
motorized optical focusing means, for adjusting for each of the locations an area size.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
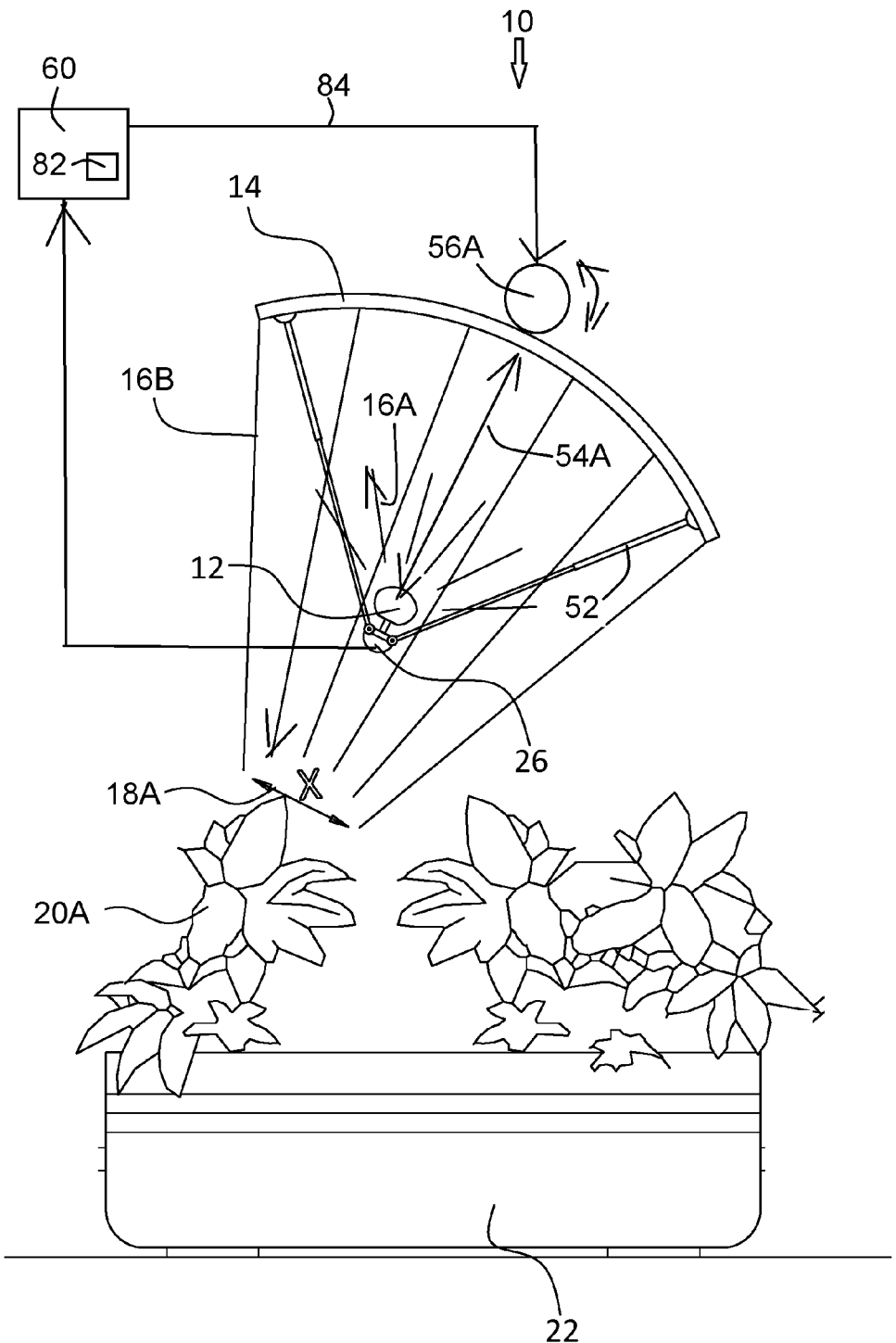
FIG. 1 is a front view of a plant growing system according to one embodiment at a first step.

FIG. 1 is a front view of a plant growing system according to one embodiment at a first step.

Figure 2:
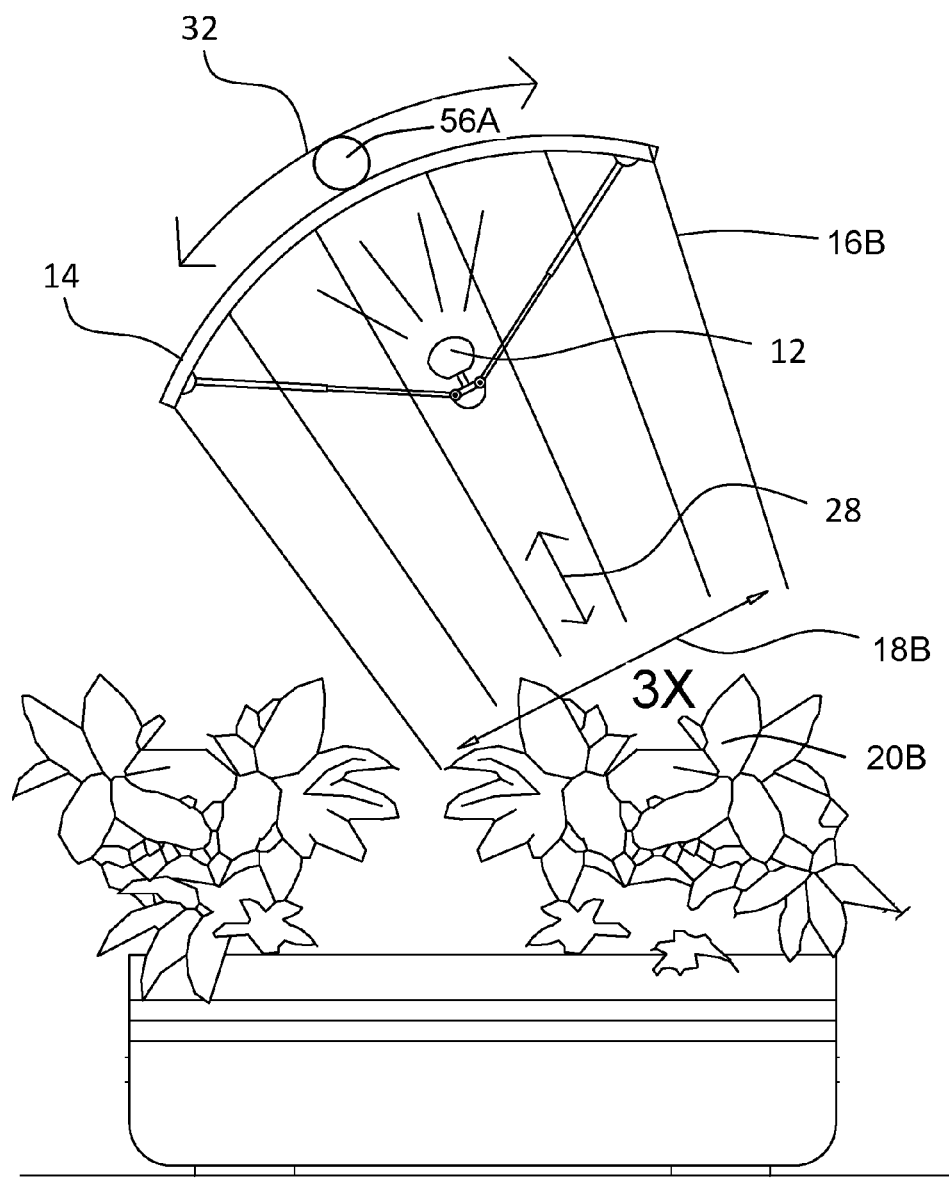
FIG. 2 is the front view of the plant growing system of FIG. 1 at a second step.

FIG. 2 is the front view of the plant growing system of FIG. 1 at a second step.

A photosynthesis illumination system 10 from plant growing includes an illumination source 12 for producing a light beam 16A; a curved ray directing element 14, such as a curved mirror or lens, for directing beam 16A to produce a beam 16B illuminating portion of a plant, substantially evenly; a motor 56A for rotating 32 curved mirror 14, for rotating beam 16A, such as either to illuminate plant 20A in FIG. 1, or to illuminate plant 20B in FIG. 2; and motorized optical focusing means 52, for determining the size of the illuminated area, such as for illuminating a portion 18A of FIG. 1, or a portion 18B of FIG. 1, being larger than portion 18A.

Motorized optical focusing means 52 may constitute any focusing element of lens or curved mirror 14 or distance adjustment means 52, such as telescopic or rotational arms 52, for determining the distance between illumination source 12 and curved mirror 14, for determining either distance 54A of FIG. 1 or distance 54B of FIG. 2.

Photosynthesis illumination system 10 is intended for scanning plants 20A, 20B, etc.

Photosynthesis illumination system 10 further includes a timer 60, for determining illumination periods, for obtaining equal photosynthesis illumination to any area unit 76 (FIG. 3) of the plants.

The same illumination source 12 illuminates portion 18A at the first step, being smaller than portion 18B of the second step, as viewed by a camera 26, thus the intensity on portion 18A is larger. Thus, timer 26 determines an illuminating period for portion 18A being larger than the illuminating period of the second step illuminating portion 18B.

Figures 3, 4:
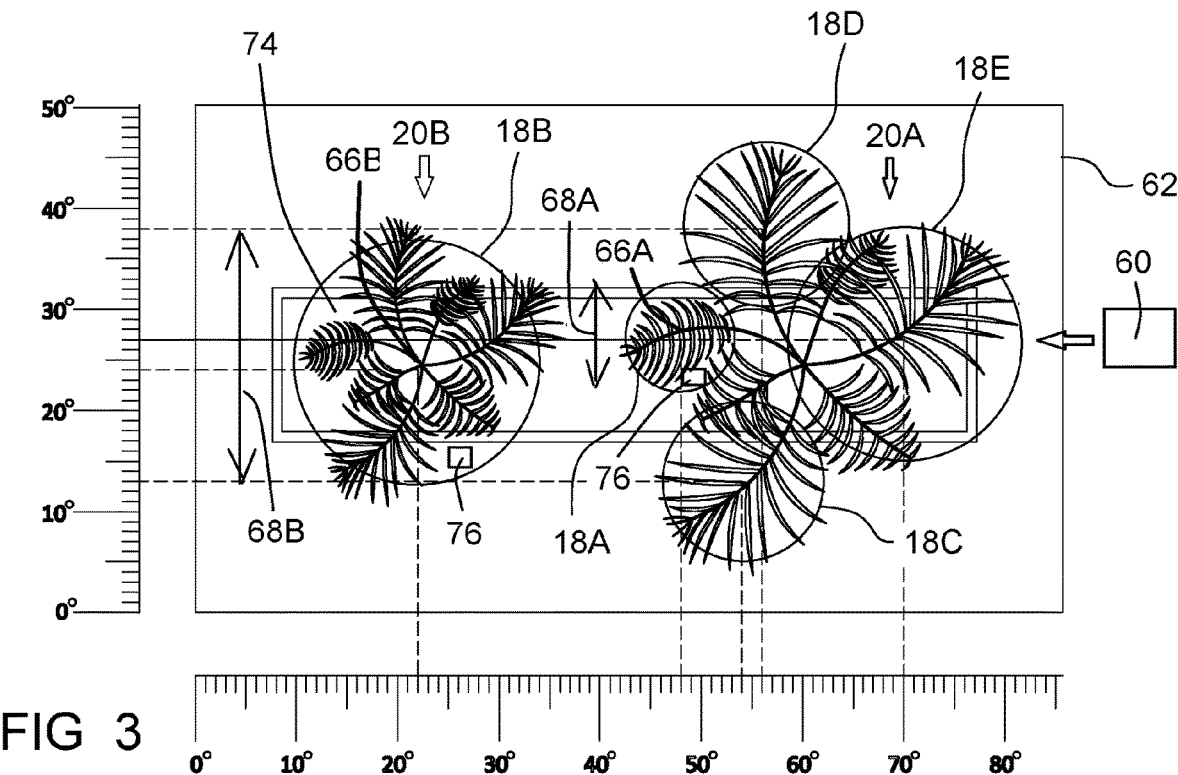
FIG. 3 is an image captured by the camera of FIG. 1.
FIG. 4 depicts the illumination analysis of the image of FIG. 3.

FIG. 3 is an image captured by the camera of FIG. 1.

A controller 60 selects portions 18A, 18B, 18C, 18D and 18E from image 62 captured by camera 26 of FIG. 1, such that the selection is optimized for avoiding illuminating areas not occupying plants.

FIG. 4 depicts the illumination analysis of the image of FIG. 3.

At the first step described in FIG. 1, the center 66A of portion 18A is of X=48 and Y=27, and the diameter 68A of portion 18A is 8 units of length or angle. Thus, controller 60 controls motor 56A, for illuminating around center 66A, and also controls motorized optical focusing means 52 for focusing the illumination to diameter 68A, being 4 (8/2) length/angle units around center 66A.

According to one example, a period 38 of 64 seconds (1 minute) is selected for illuminating portion 18A, thus a schedule 40 starting from 10 o'clock ends illumination of portion 18A at 10.01 o'clock.

At the second step described in FIG. 2, the center 66B of portion 18B is of X=22 and Y=24, and the diameter 68B of portion 18B is 24 length or angle units. Thus, controller 60 controls motor 56A, for illuminating around center 66B, and also controls motorized optical focusing means 52 for focusing the illumination to diameter 68B, being 12 (12/2) length/angle units around center 66A.

Diameter 68B for portion 18B is adjusted to be 3 times larger than diameter 68A of portion 18A, thus the area 74 is 9 times larger. Thus the illumination by the same illumination source is 9 times smaller. Thus, controller 60 determines a period 38 being proportional, thus being 9 times larger, thus being 576 (9 minutes) seconds for portion 18B, as being 9*64 seconds of portion 18A.

Thus, schedule 40 starting from 10.01 o'clock for portion 18A ends the illumination of portion 18B at 10.10 o'clock.

In the example of table 70, the values of period 38 are the square of values of diameter 36, since the area is a factor (Pi) of the square of diameter 36, thus period 38 is proportional to area 74.

Table 70 further continues schedule 40 for portions 18C, 18D and 18E, for obtaining equal photosynthesis illumination to all area units 76 (FIG. 3) of the plants.

Figure 5:
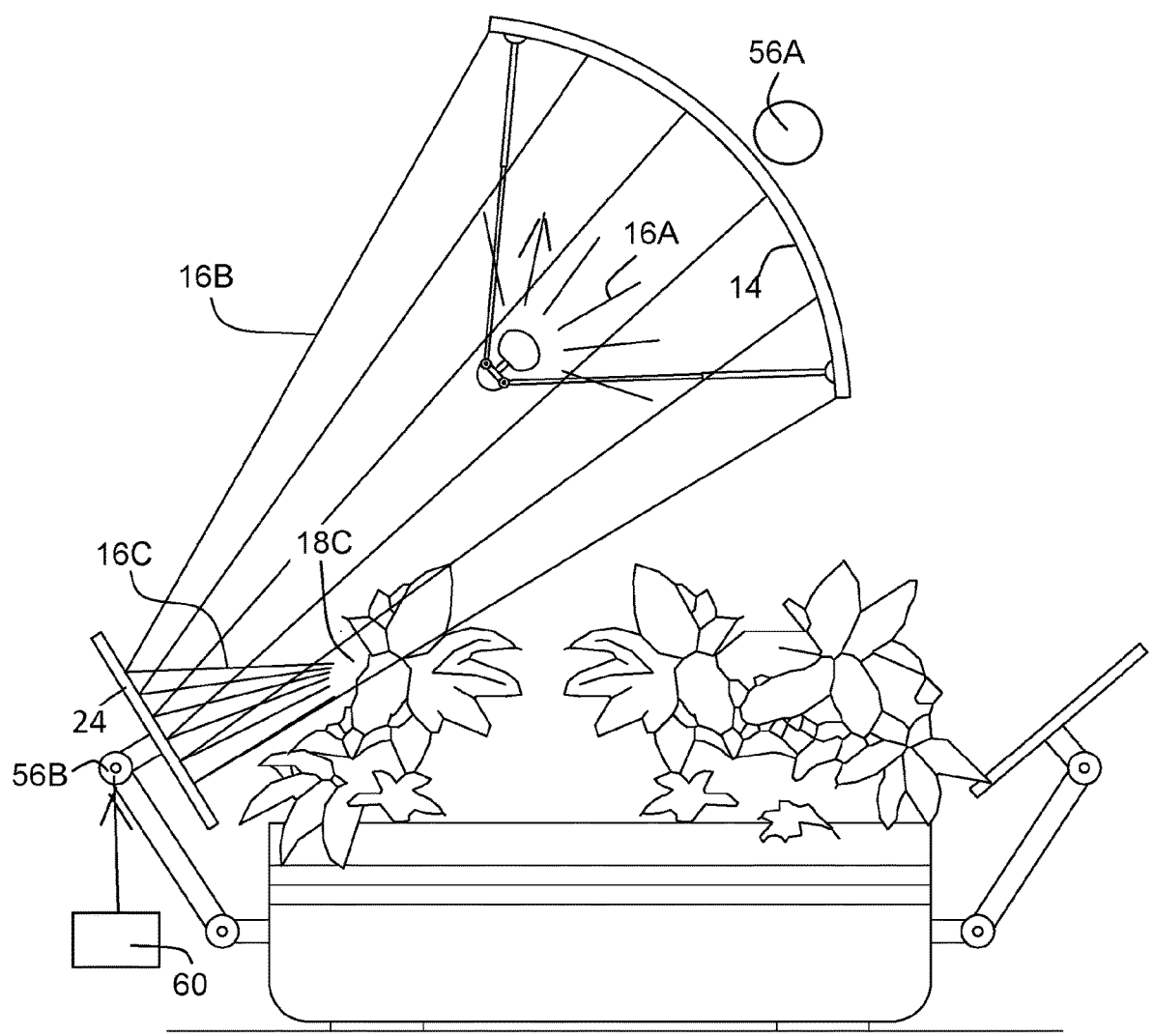
FIG. 5 is a front view of the plant growing system of FIG. 1, further including additional mirrors.

FIG. 5 is a front view of the plant growing system of FIG. 1, further including additional mirrors.

Portions being hidden from beam 16B may be illuminated by directing beam 16B by a mirror 24, to produce a beam 16C, illuminating portion 18C. Mirror 24 may be rotated by a motor 56B, controlled by controller 60.

Thus, in one aspect, the invention is directed to a photosynthesis illumination system (10), including:
- a curved ray directing element (14), such as a lens, for directing an illumination beam (16A) towards at least one plant (20A);
- a motor (56A) for rotating (32) the ray directing element (14), for selecting different locations (66A) of the at least one plant (20A) to be illuminated by the illumination beam (16A);
- motorized optical focusing means (52), for adjusting for each of the locations (66A) an area size (74), thereby determining a portion (18A) of the at least one plant (20A) to be illuminated; and
- a controller (60), for controlling the motor (56A) and the motorized optical focusing means (52), to provide an equal illumination energy to each area unit (76) of the at least one plant (20A), and for not illuminating any other area.

The control to provide the equal illumination energy to each area unit (76) of the at least one plant (20A), includes providing to each of the illuminated portions (18A,18B) an illuminating period (38) being proportional to the area size (74) thereof.

The photosynthesis illumination system (10) may further include:
- a camera (26), for producing an image (62) of the at least one plant (20A); and
- an image processor (82), for determining from the image (62) the portions (18A, 18B) of the at least one plant (20A) to be illuminated.

The camera (26) may be disposed near the illumination source (12) producing the illumination beam (16A), thereby the rotating (32) of the ray directing element (14) aims the camera (26) to the different locations (66A) being illuminated by the illumination beam (16A)

The photosynthesis illumination system (10) may further include:
- at least one motorized mirror (24), for directing the illumination beam (16A) to portions of the at least one plant (20A) being hidden from the curved ray directing element (14).

In another aspect, the invention is directed to a photosynthesis illumination method including the steps of:
- directing, by a curved ray directing element (14), an illumination beam (16A) towards at least one plant (20A);
- rotating (32), by a motor (56A), the ray directing element (14), for selecting different locations (66A) of the at least one plant (20A) to be illuminated by the illumination beam (16A);
- for each of the locations (66A), adjusting by motorized optical focusing means (52), an area size (74), thereby determining a portion (18A) of the at least one plant (20A) to be illuminated; and
- controlling the first motor (56A) and the motorized optical focusing means (52), to provide an equal illumination energy to each area unit (76) of the at least one plant (20A), and for not illuminating any other area.

The control to provide the equal illumination energy to each area unit (76) of the at least one plant (20A), may include providing to each of the illuminated portions (18A, 18B) an illuminating period (38) being proportional to the area size (74) thereof.

The photosynthesis illumination method may further include:
- producing an image (62) of the at least one plant (20A), by a camera (26); and
- determining from the image (62), by an image processor (82), the portions (18A,18B) of the at least one plant (20A) to be illuminated.

The photosynthesis illumination method may further include:
- directing, by at least one motorized mirror (24), the illumination beam (16A) to portions of the at least one plant (20A) being hidden from the curved ray directing element (14).

In the figures and/or description herein, the following reference numerals (Reference Signs List) have been mentioned:
numeral 10 denotes the photosynthesis illumination system according to one embodiment of the invention;
12: illumination source, such as a lamp;
16A, 16B, 16C: illumination beams;
18A, 18B, 18C, 18D, 18E: portions of the plant, each illuminated at a different time;
20A, 20B: plants;
22: plant compartment;
26: camera;
28: distance changing;
40: schedule;
52: motorized optical focusing means, such as telescopic arms;
54A, 54B: distances;
56A, 56B: motors;
60: controller;
66A, 66B: illuminated location, typically the center thereof;
68A, 68B: diameters of illuminated portions;
38: illumination period;
70: table of schedule for illumination characters;
74: area or illuminated portion 18A or other;
76: area unit;
82: image processor;
84: control;

The foregoing description and illustrations of the embodiments of the invention have been presented for the purpose of illustration, and are not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A photosynthesis illumination method comprising the steps of:
   directing, by a curved ray directing element, an illumination beam towards at least one plant;
   rotating, by a motor, said ray directing element, for selecting different locations of said at least one plant to be illuminated by said illumination beam;
   for each of said locations, adjusting by motorized optical focusing means, an area size, thereby determining a portion of said at least one plant to be illuminated; and controlling said motor and said motorized optical focusing means, to provide an equal illumination energy to each area unit of said at least one plant, and for not illuminating any other area.

2. The photosynthesis illumination method according to claim 1, wherein said control to provide said equal illumination energy to each area unit of said at least one plant, comprises providing to each of said illuminated portions an illuminating period being proportional to the area size thereof.

3. The photosynthesis illumination method according to claim 1, further comprising:
  producing an image of said at least one plant, by a camera; and
  determining from said image, by an image processor, said portions of said at least one plant to be illuminated.

4. The photosynthesis illumination method according to claim 1, further comprising:
  directing, by at least one motorized mirror, said illumination beam to portions of said at least one plant being hidden from said curved ray directing element.

\* \* \* \* \*